US006035634A

United States Patent [19]

Tupper et al.

[11] Patent Number: 6,035,634

[45] Date of Patent: Mar. 14, 2000

[54] COMPACT, RESISTANCE REGULATED, MULTIPLE OUTPUT HYDRAULIC TOOL AND SEAL VALVE ARRANGEMENT

[75] Inventors: Myron D. Tupper, Boring; Bill Gallentine, Hood River, both of Oreg.

[73] Assignee: Latch-Tool Development Co. LLC, Colorado Springs, Colo.

[21] Appl. No.: 09/246,847

[22] Filed: Feb. 9, 1999

[51] Int. Cl.[7] .................... F16D 31/02

[52] U.S. Cl. .................... 60/477; 92/249; 92/255

[58] Field of Search .................... 92/247, 248, 249, 92/255; 60/325, 477, 413

[56] References Cited

U.S. PATENT DOCUMENTS

| | | | |
|---|---|---|---|
| 1,717,271 | 6/1929 | Simmons . | |
| 1,894,358 | 1/1933 | Mortimer . | |
| 2,704,087 | 3/1955 | Lindsay . | |
| 2,734,723 | 2/1956 | Larcen . | |
| 2,951,467 | 9/1960 | Morrison . | |
| 2,969,771 | 1/1961 | Caudill . | |
| 3,169,455 | 2/1965 | Hoffmann | 92/247 X |
| 3,320,861 | 5/1967 | Johnson et al. . | |
| 3,587,755 | 6/1971 | Slusher . | |
| 4,010,609 | 3/1977 | Boutroy et al. . | |
| 4,031,619 | 6/1977 | Gregory | 60/477 X |
| 4,206,603 | 6/1980 | Mekler | 60/477 |
| 4,246,973 | 1/1981 | Mayer . | |
| 4,263,801 | 4/1981 | Gregory . | |
| 4,356,871 | 11/1982 | Fujikawa . | |
| 4,460,051 | 7/1984 | Widmer . | |
| 4,514,796 | 4/1985 | Saulters et al. . | |
| 4,689,957 | 9/1987 | Gallentine | 60/477 X |
| 4,722,507 | 2/1988 | Lindackers et al. | 92/247 X |
| 4,899,836 | 2/1990 | Venot . | |
| 4,947,672 | 8/1990 | Pecora et al. . | |
| 4,947,941 | 8/1990 | Sudnishnikov et al. . | |
| 4,957,021 | 9/1990 | Helton . | |
| 5,065,664 | 11/1991 | Ohta et al. . | |
| 5,361,680 | 11/1994 | Matsui . | |
| 5,375,418 | 12/1994 | Shelhart et al. . | |
| 5,477,932 | 12/1995 | Asakura et al. . | |

FOREIGN PATENT DOCUMENTS

| | | | |
|---|---|---|---|
| 655522 | 7/1951 | United Kingdom | 92/247 |

*Primary Examiner*—Hoang Nguyen
*Attorney, Agent, or Firm*—Farkas & Manelli; E. J. Stemberger

[57] ABSTRACT

A hydraulic device includes a housing and a bulkhead disposed in the housing. A pump piston is provided in the housing and has first and second end surfaces with the second end surface of the pump piston and surfaces of the housing and of the bulkhead defining a pumping chamber. The pump piston is constructed and arranged to move within the housing to develop pressure on fluid in the pumping chamber. The first end surface of the pump piston and surfaces of the housing define a pump reservoir chamber. A ram piston is provided in the housing and has first and second end surfaces with the first end surface of the ram piston and surfaces of the housing and of the bulkhead defining a drive chamber. Connecting structure is associated with the bulkhead to communicate the pumping chamber with the drive chamber so that fluid pressure developed in the pumping chamber may be exerted on the first end surface of said ram piston. A barrier is provided in the housing between an end of the housing and the ram piston. Surfaces of the housing, the barrier and the second end surface of the ram piston define a ram reservoir chamber, and surfaces of the second end of the housing and of the barrier define an accumulator chamber. Passage and valve structure is associated with the barrier to selectively permit fluid to flow from the ram reservoir chamber to the accumulator chamber and from the accumulator chamber to the ram reservoir chamber. Passage and valve structure is associated with the ram piston to permit fluid flow from the ram reservoir chamber to the drive chamber. Passage and valve structure is associated with the pump piston to selectively permit fluid flow from the pump reservoir chamber to the pumping chamber and from the pumping chamber to the pump reservoir chamber, Communication structure fluidly communicates the accumulator chamber with the pump reservoir chamber. The ram piston is movable selectively at three speeds with corresponding magnitudes of force relative to a single speed of the pump piston.

35 Claims, 4 Drawing Sheets

COMPACT, RESISTANCE REGULATED, MULTIPLE OUTPUT HYDRAULIC TOOL AND SEAL VALVE ARRANGEMENT

BACKGROUND OF THE INVENTION

1. Field of the Invention

The present invention relates to manually actuated, hydraulically operated tools of the type having working elements such as jaws or cutters which close over a workpiece. More particularly, the invention relates to a hand tool having a hydraulic circuit contained entirely within a housing containing two pistons. One piston converts manual input force to fluid pressure. The other piston converts fluid pressure to output force for imposing on the work. The tool enables three speeds of closure of jaw or corresponding tool movement at one input speed.

The field of endeavor most likely to benefit from this invention is the construction industry in that the device is specifically intended for use in creating effective hand tools which are often used in the building trades. However, the general fields of mechanical assembly and automotive repair could also benefit from the apparatus herein disclosed. For example, any process requiring crimping, bending, punching, cutting, pressing, etc. could significantly benefit from the performance characteristics of the instant hydraulic tool.

It can be appreciated that the potential field of use for this invention are myriad and the particular preferred embodiment described herein is in no way meant to limit the use of the invention to the particular field chosen for exposition of the details of the invention.

2. Description of Related Art

Gripping, clamping, pressing, and punching tools frequently employ hydraulic circuits for actuating solid moving parts of the tool. Hydraulics are quite practical to magnify manual force which can be applied to a work piece. Magnification of force is readily accomplished by varying respective areas of driving and driven components, such as a pump plunger and a driven piston, subjected to fluid pressure. Overpressure relief valves and manual release valves are also easily incorporated into hydraulic circuitry. However, the incorporation of such valving features has previously added considerable expense and complexity to the mechanism. This expense has been a major reason that small hydraulic hand tools have not achieved widespread success in the marketplace.

Thus, there is a need to provide hydraulic tool of reduced complexity and thus of reduced cost.

Furthermore, when a conventional manual hydraulic tool, such as an automotive jack, is designed to develop great force it requires a large input stroke (or many smaller such strokes) to generate a small output motion. This is tedious and wasted motion during the period when a magnified output force is not needed. For example, when a tool has not yet engaged its work, it is wasteful to have to provide very long (or very many) input strokes to move the tool a very small distance toward its eventual working position. Most prior art hydraulic hand tools are designed to provide only one mode of operation, that being intended for applying great force after the point of contact with the work piece. When initially positioning the tool to the work, pumping a small volume of fluid per stroke so as to develop high pressure for operating the tool is pointless when no significant output resistance is encountered.

Thus, there is a further need to provide not only a tool which could rapidly advance the driven piston to a working piston with minimal mechanical input, but also which hydraulically magnifies the mechanical input to impart very high output forces once the work is engaged.

SUMMARY OF THE INVENTION

An object of the present invention is to fulfill the needs referred to above. In accordance with the principles of the present invention, this objective is obtained by providing a hydraulic device including a housing. A bulkhead is disposed in the housing. A pump piston is provided in the housing and has first and second end surfaces with the second end surface of the pump piston and surfaces of the housing and of the bulkhead defining a pumping chamber. The pump piston is constructed and arranged to move within the housing to develop pressure on fluid in the pumping chamber. The first end surface of the pump piston and surfaces of the housing define a pump reservoir chamber. A ram piston is provided in the housing and has first and second end surfaces with the first end surface of the ram piston and surfaces of the housing and of the bulkhead defining a drive chamber. Connecting structure is associated with the bulkhead to communicate the pumping chamber with the drive chamber so that fluid pressure developed in the pumping chamber may be exerted on the first end surface of said ram piston. A barrier is provided in the housing between an end of the housing and the ram piston. Surfaces of the housing, the barrier and the second end surface of the ram piston define a ram reservoir chamber, and surfaces of the second end of the housing and of the barrier define an accumulator chamber. Passage and valve structure is associated with the barrier to selectively permit fluid to flow from the ram reservoir chamber to the accumulator chamber and from the accumulator chamber to the ram reservoir chamber. Passage and valve structure is associated with the ram piston to permit fluid flow from the ram reservoir chamber to the drive chamber. Passage and valve structure is associated with the pump piston to selectively permit fluid flow from the pump reservoir chamber to the pumping chamber and from the pumping chamber to the pump reservoir chamber. Communication structure fluidly communicates the accumulator chamber with the pump reservoir chamber. The communication structure, the connecting structure and the passage and valve structures are constructed and arranged to permit movement of the ram piston selectively at three speeds with corresponding magnitudes of force relative to a single speed of the pump piston.

In accordance with another aspect of the invention, a hydraulic tool includes a housing. A pump piston is disposed in the housing to define a pumping chamber at one end thereof and a pump reservoir chamber at another end of the pump piston. The pump piston is constructed and arranged to move within the housing to develop pressure on fluid in the pumping chamber. A ram piston is disposed in the housing to define a drive chamber. Fluid circuitry permits fluid communication between the pumping chamber and the drive chamber such that fluid pressure developed in the pumping chamber is imposed on the ram piston to move the ram piston in a certain direction. The fluid circuitry is constructed and arranged to move the ram piston in the certain direction at three different speeds with corresponding magnitudes of force relative to a single speed of the pump piston. A ram piston return valve structure is constructed and arranged to selectively communicate the drive chamber with the pump reservoir chamber thereby initiating movement of the ram piston in a direction opposite the certain direction.

Other objects, features and characteristic of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

Various other objects, features, and advantages of the present invention will become more fully appreciated as the same becomes better understood when considered in conjunction with the accompanying drawings, wherein like parts are given like numerals.

DETAILED DESCRIPTION OF THE PREFERRED EMBODIMENTS

Figure 1:
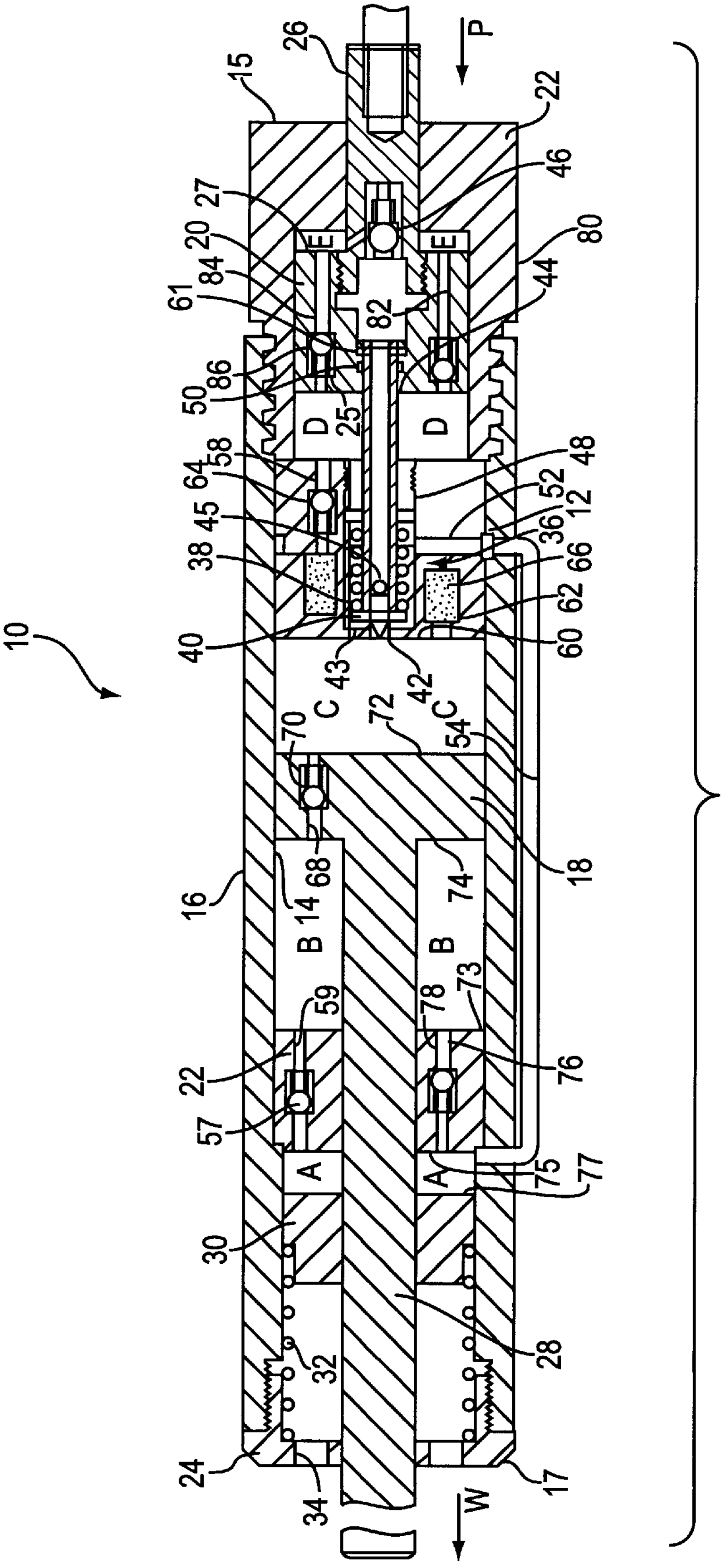
FIG. 1 is a diagrammatic, side cross-sectional view of a hydraulic device provided in accordance with the principles of a first embodiment of the present invention.

With reference to FIG. 1, a three-speed hydraulic device preferably in the form of a tool is shown, generally indicated at 10, provided in accordance with the principles of the present invention. The hydraulic tool 10 includes a cylindrical bulkhead 12 disposed within an interior bore 14 of a unitary cylindrical housing structure 16. Interior bore 14 encloses a ram piston 18 driven by pressurized fluid and a pump piston 20 for developing this pressure. At a first end 15 and a second end 17 of the housing 16, a removable housing end cap 22 and 24, respectively, is provided. The end caps are shown as being threaded into the housing 16 but other forms of attachment, such as bolts or the like, could be used. In the broadest aspect of the invention, the end caps 22 and 24 may be considered to be part of the housing 16. The cylindrical housing, piston, and ram could be of square, hexagonal or other cross-section if desired. Furthermore, the housing structure 16 may be composed of separate housings, such as, a pump housing and a ram housing.

In the illustrated embodiment, interior bore 14 is subdivided into a pumping chamber D, a driving chamber C, a pump reservoir chamber E, a ram reservoir chamber B and an accumulator chamber A. The chambers A, B and E receive and dispense fluid displaced during operation of the tool 10. The pumping chamber is defined by a first end surface 25 of the pump piston 20 and surfaces of the bulkhead 12 and of the housing 16. Pump reservoir chamber E is defined by the surfaces of the first end 15 of the housing 16 and a second end surface 27 of the pump piston 20. The drive chamber C is defined by surfaces of the bulkhead 12 and of the housing 16 and a first or rear surface 72 of the ram piston 18. Ram reservoir chamber B is defined by surfaces of the housing 16, of surface 73 of the barrier 22, and of a second or front surface 74 of the ram piston 18. Finally, accumulator chamber A is defined by surfaces of the housing 16, of surface 75 of the barrier 22, and of surface 77 of an accumulator piston 30 which is located at the second end of the housing 16.

The total volume of all the chambers is slightly variable due to fluid displaced by the pump piston rod 26 and the ram piston rod 28 during movement of the pump piston 20 and ram piston 18. This rod displacement volume variation is accommodated by a spring loaded accumulator piston 30, which forms a movable end wall sealing chamber A at the left side thereof, as depicted in FIG. 1. Accumulator piston 30 has an opening closely cooperating with ram piston rod 28. A spring 32 urges the accumulator piston 30 to the right as show in FIG. 1. Spring 32 is suitably entrapped within housing 16 so that it acts continuously against piston 30. In the broadest aspect of the invention, the accumulator piston 30 may be considered part of the second end of the housing 16. The area within housing 16 enclosing spring 32 is open to the atmosphere via ports 34 to avoid fluid pressures below atmospheric pressure, which would tend to interfere with operation of the tool 10.

The bulkhead 12 includes a ram piston return and overpressure valve structure, generally indicated at 36 in FIG. 1. The valve structure 36 is preferably a spring loaded valve having a spring 38 which acts on valve member 40 to seal opening 42 in the bulkhead 12. Opening 42 communicates with drive chamber C and with chamber 43 which houses the valve structure 36. A conduit 44 is operatively coupled with the valve member 40 at one end thereof. The other end of the conduit 44 is operatively associated with the pump piston 20 and communicates with pump reservoir chamber E through check valve 46. Conduit 44 communicates with bulkhead chamber 43 via passage 45. O-rings 48 and 50 are provided about the conduit 44 to permit the normal pump stroke without moving the conduit 44 or the valve structure 36. A conduit 52 is in communication with chamber 43 and communicates with an external conduit 54. Conduit 54 is in communication with accumulator chamber A and together with conduit 52, chamber 43, conduit 44 define communication structure fluidly communicating the accumulator chamber A with the pump reservoir chamber E. Check valve 46 may be considered to be part of the communication structure.

Although the conduit 54 is shown to be external to the housing 16, it can be appreciated that the conduit 54 may be a channel defined in the wall of housing 16. In addition, it can be appreciated that configuration of the communication structure is not limited to that described above, but includes any structure which permits fluid communication from the accumulator chamber A to pump reservoir chamber E.

A first mode of operation of the tool 10 is a high-speed, low force mode in which jaws (not shown) or other working elements associated with the hydraulic tool 10 are moved into engagement with a workpiece. There is little need for force beyond moving the working elements to the point of contact with the work piece. Hence, force is exchanged for increase speed of closure of the jaws during positioning of the tool on the workpiece.

With reference to FIG. 1, the high-speed mode for closing of a the working elements will now be described. Force is applied via input shaft 26 of pump piston 20 in the direction of arrow P. This may be accomplished, for example, by actuating a hand operated trigger (not shown in FIG. 1). Fluid contained in pumping chamber D is pressurized and flows through connecting structure to enter drive chamber C thereby urging ram piston 18 toward the left in FIG. 1. In the illustrated embodiment, the connecting structure comprises conduits 58 and 60, and an annular channel 62 so as to fluidly communicate chambers C and D. A unidirectional valve in the form of a check valve 64 in conduit 58 of the bulkhead 12 opposes back flow from chamber C to chamber D. A filter 66 is provided in channel 62 to filter out any foreign material in the fluid so as to not disrupt operation of any of the valves in the tool 10.

When no resistance is imposed upon ram rod 28, fluid is ejected from ram reservoir chamber B through conduit 68 past a unidirectional high-speed control valve structure, preferably a check valve 70 and into drive chamber C. This is possible since the net effective area of rear surface 72 of piston ram piston 18 exceeds that of front surface 74 due to the presence of ram rod 28 reducing effective area of front surface 74. Thus, pressure in chamber B is incrementally greater than that in chamber C which expresses fluid from chamber B to chamber C until the pressures are equal in chambers B and C causing the ram rod 28 to move rapidly in the direction of arrow W. Equilibrium is accomplished when the opposing force of friction or resistance from engaging the work equals the pressure in chamber C divided by the cross-sectional area of the ram rod 28. This action increases speed of pump piston 20 relative to that which would result if pumping chamber D were the only source of fluid entering drive chamber C. In addition, the accumulator chamber A communicates with pump reservoir chamber E as explained above which further causes the pump piston 20 to move in the direction of arrow P. The increased speed of pump piston 20 gives rise to the aforementioned high speed mode.

When ram rod 28 encounters a predetermined degree of resistance which would correspond to engagement of the workpiece, the pressure in chamber B builds and overcomes spring loaded check valve 78 thereby opening conduit 76. At this time, an intermediate speed mode prevails as fluid is continuously pumped from pumping chamber D to drive chamber C through conduit 58 past check valve 64. The fluid from ram reservoir chamber B is now diverted to the accumulator chamber A, rather than back to pumping chamber D through conduit 68 and valve 70, since the back-pressure on valve 70 from chamber C now keeps valve 70 closed. Fluid from the accumulator chamber A moves through conduit 54, 36, chamber 43, conduit 44 past check valve 46 to back-fill the pump reservoir chamber E.

When still greater resistance is encountered requiring added force over that available in the intermediate mode, a low speed, high force mode prevails. When increased pressure developed in pumping chamber D opens control valve structure in the form of a spring loaded check valve 80 in conduit 82, some fluid ejected from pumping chamber D flows into pump reservoir chamber E. This action bypasses the surface area of pump piston 20 thus bringing the cross-sectional area of the pump rod 26 into play. The pressure produced from the mechanical input force, which remains constant, is therefore increased by the ratio of the pump piston surface and the cross-sectional area of the pump rod 26. As an example, assuming that the diameter of the pump rod 26 is one-third of the diameter of he pump piston, then the pressure in chamber B would be 9 times greater than that before the shift to this high force mode. In this mode, pumping chamber D communicates with drive chamber C through conduit 58, 60 and channel 62 via valve structure 64 and ram reservoir chamber B communicates with the accumulator chamber A through conduit 76 via valve structure 78. It can be appreciated that for a given force applied to piston rod 26 in the low speed, high force mode, the pressure generated in pumping chamber D increases in proportion to the decrease in the net effective area of piston 20. This increased pressure is translated to ram piston 18 which in turn delivers an increased force to the ram rod 28.

Anytime the pump piston 20 is retracted to the right (in the direction opposite that of arrow P in FIG. 1), by pulling on shaft 26, a pump piston return stroke is initiated. Just prior to this action, chamber E has been back-filled by action of the accumulator chamber A expressing fluid through conduits 54 and 36, chamber 43, conduit 44, past check valve 46. Now as the pump piston 20 is moved to the right, the pressure in pump reservoir chamber E begins to increase which closes valve 46 and cracks open check valve 86 and allowing fluid to pass into to pumping chamber D.

The valve structure 36 functions as a combined over-pressure relief and pressure release mechanism. During the normal course of operations, fluid pressure in the tool 10 continues to increase by action of the pump piston 20 which in turn imparts increased force on ram piston 28. When pressure in the drive chamber C reaches a pre-determined pressure as regulated by spring 38, valve 40 disengages form its seat, thus permitting fluid flow through opening 42. Fluid moves into bulkhead chamber 43 until the pressure in the drive chamber C returns to the pre-determined maximum pressure. Fluid entering chamber 43 is distributed to piston reservoir chamber E through conduit 44 and secondarily through conduits 52, 54 and into chamber A. This overpressure relief mechanism prevents the tool 10 from becoming too aggressive for its work and provides the user a cautionary measure of safety. Now once the tool 10 has performed its work, valve structure 36 becomes the mechanism for releasing and resetting the tool 10. Over-travel of the pump piston 20 away from the bulkhead 12 beyond its normal pumping range will cause shoulder 61 to be engaged causing it to travel to the right in FIG. 1. This action unseats valve 40 permitting fluid in drive chamber C to communicate with accumulator camber A, and through conduit 59 and valve 57, to communicate with ram reservoir chamber B, and through chamber 43 and conduit 44, to communicate with the piston reservoir chamber E, and through conduit 84 and valve 86, to communicate with pumping chamber D. While in this mode, ram 28 may be retracted into the tool 10 by hand or some other external force. Once the tool 10 has been reset, the pump piston is released form its over-traveled position and spring 38 will reseat valve 40.

When the ram piston 18 is to be retracted into the tool 10 by some external force (not shown), the pump piston 20 is pulled to its over-traveled position, thereby unseating valve member 40 and opening passage 42. Retracting the ram piston 18 forces fluid from chamber C through bulkhead chamber 43, conduits 52 and 54 into the accumulator chamber A. Fluid from the accumulator chamber A passes through conduit 59 and valve 57 in the barrier 22 to back fill chamber B. The net addition of the fluid to the accumulator chamber A is essentially the volume of the ram rod 28 now pushed back into the tool 10. At the point that the pump piston 20 is in its over-traveled position and valve member 40 is opened, all chambers are communicating with one another and pressures are equalizing. When valve member 40 is opened, fluid in the drive chamber C communicates with the pump reservoir chamber E via conduit 44 and fluid in the pump reservoir chamber E communicates with the pumping chamber D via passage passages 86. Fluid demands for chambers D and E have essentially already been supplied, accumulator chamber A now expands to take up the fluid displaced by the ram rod 28 as it is retracted into the tool 10.

In summary, the ram piston 18 moves at increased speed and reduced force relative to the pump piston 20 when fluid is routed from one side of the ram piston 18 to the other side thereof. Similarly, ram piston 18 moves at a reduced speed and with increased force relative to the pump piston 20 when fluid is routed from one side of the pump piston 20 to the other side thereof. When neither of these flow routs occur, an intermediate speed, intermediate force mode prevails.

The check valves described herein are conventional and preferably of the spring-actuated, ball or needle valve type.

Figure 2:
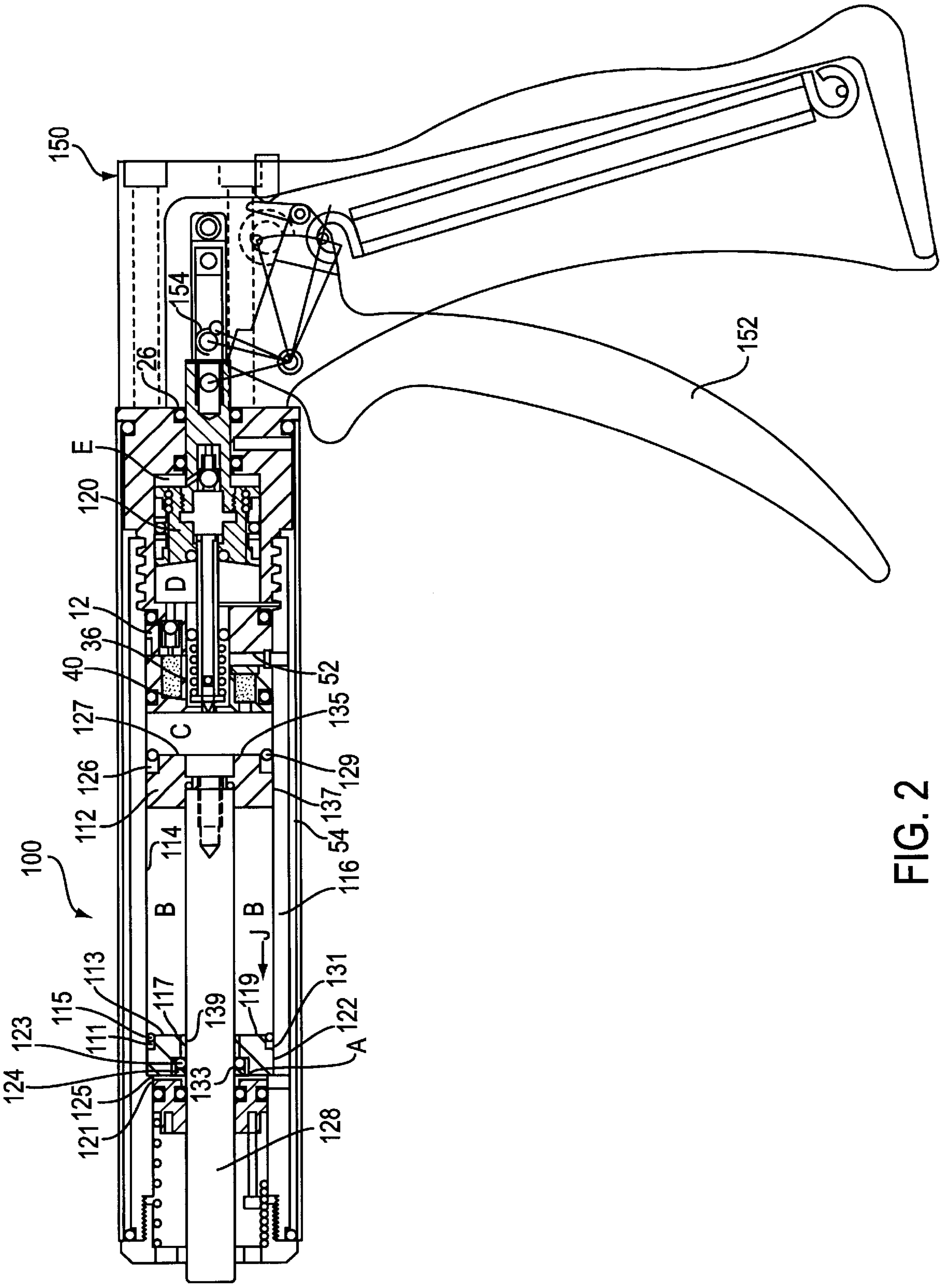
FIG. 2 is a diagrammatic, side cross-sectional view of a hydraulic tool provided in accordance with the principles of a second embodiment of the present invention.
Figure 3:
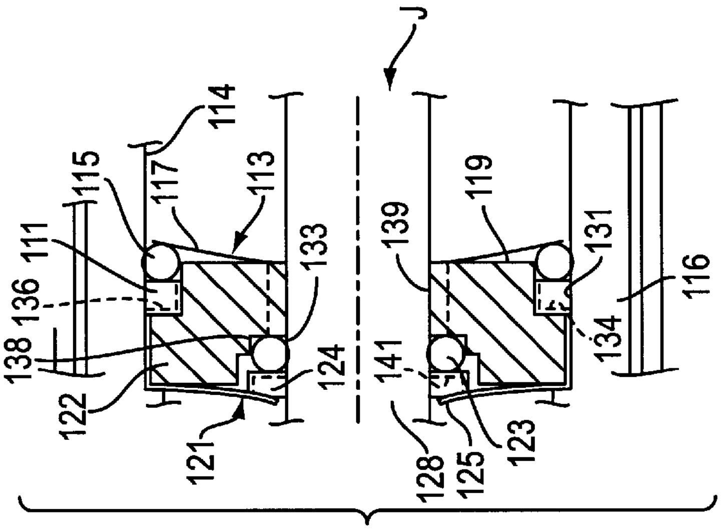
FIG. 3 is an enlarged view of a floating seal valve assembly associated with the barrier of the hydraulic tool of FIG. 2.

A second embodiment of the invention is shown in FIGS. 2 and 3. The second embodiment of the tool 100 functions the same as the first embodiment, (e.g. , provides three speeds of operation). However, in the second embodiment, certain of the valve structures are in the form of floating seal valves, not check valves.

Since it is difficult to provide the proper volumetric flows in the small tool package using check valves, FIGS. 2 and 3 show a second embodiment of the invention. Thus, instead of providing conduits and check valves in the barrier 122, valve structure in the form of a floating seal valve assembly is associated with the barrier 122. As shown, the floating seal valve assembly includes a first floating seal valve, generally indicated at 113, comprising an O-ring 115 sealing a passage 131 between an outer periphery of the generally cylindrical barrier 122 and the annular wall defining inner bore 114 of the housing 116, and a spring retainer member 117 coupled to face 119 of the barrier 122 and operatively associated with the O-ring 115. In the illustrated embodiment, the floating seal valve 113 also includes a glide member 111 provided between the O-ring 115 and retainer member 117. The spring retainer member 117 slides the glide member 111 on the bore 114 and holds it against a stepped shoulder 134 defined in the barrier 122. The stepped shoulder dimensions as related to the cylinder bore 114 are typical of those required to provide a seal when the glide member 111 is in place. The axial length of the stepped shoulder and/or it's slope are such that a small hydraulic pressure can move the glide member 111 off of the shoulder 134. The glide member has a passage 136 therethrough such that when the hydraulic force deflects the spring retainer member 117, a very large fluid flow path is provided. Thus, since the glide member 111 is bearing against the shoulder 134, the glide member can support a high pressure in one direction yet permit easy flow of fluid in the opposite direction. In certain applications, the spring force on the glide member 111 may be high enough to require a predetermined pressure before the glide member 111 is moved off the stepped shoulder 134. The retainer member 117 is preferably composed of spring material such as metal and gently biases the O-ring 115 in the direction of arrow J of FIG. 2 to seal the passages 131 and 136. In the broadest aspect of the invention, the glide member 111 may be omitted.

A second, similar floating seal valve, generally indicated at 121, comprises O-ring 123, spring retainer member 125, and glide member 124 between the retainer member 125 and the O-ring 123. The O-ring bears against shoulder 138. The retainer member 125 is fixed to a surface of the barrier 122. The second floating seal valve is provided so as to selectively seal a passage 141 through the glide member 124 and passage 133 between the outer surface of the ram rod 128 and an inner wall defining bore 139 of the barrier 122. The spring load of retainer member 125 is selected such that when conditions are such that fluid may flow from ram reservoir chamber B to accumulator chamber A, the retainer 125 will flex to permit fluid to flow past the O-ring 123 and through passages 131 and 141 in the direction of arrow J. Similarly, the spring load of the retainer member 117 is such that in a ram piston retracting mode, fluid may flow past O-ring 115 through passages 141 and 133 in the direction opposite to arrow J such that fluid in the accumulator chamber A may move into ram reservoir chamber B. In the broadest aspect of the invention, the glide member 124 may be omitted.

Floating seal valve structure 127, including O-ring 129, glide member 126 and spring retainer member 135, is provided at the ram piston 112. As with floating seal valve structure 113 associated with the barrier 122, the retainer member 135 biases the O-ring 129 against a shoulder to seal a passage 137 between the periphery of the ram piston 112 and the housing inner bore 14. Thus, retainer member 135 is constructed and arranged to prevent fluid communication between the drive chamber C and ram reservoir chamber B and when required, permit large volumetric flow from ram reservoir chamber B to drive chamber C. The spring load of floating seal valve 121 is greater than that of floating seal valve 127 so as to effect the shift between the high-speed/low force and the mid-speed/mid force modes of operation. In the broadest aspect of the invention, the glide member 126 may be omitted.

The O-rings described herein may be conventional, circular cross-section O-rings. However, other cross-sectional shapes may be used, such as, for example, rectangular, square, and U-shaped cross-sections.

Figure 4:
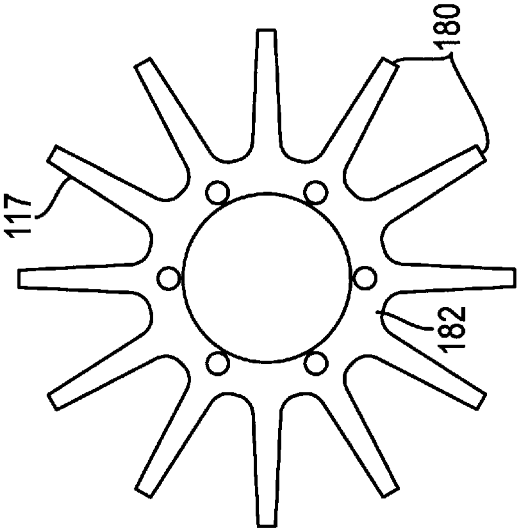
FIG. 4 is an enlarged view of a spring retainer member of the floating seal valve assembly of FIG. 3.

The spring retainer member 117 preferably has a plurality of fingers 180 extending from a central portion 182 thereof as shown in FIG. 4. Spring retainer member 135 is configured similarly.

Figure 5:
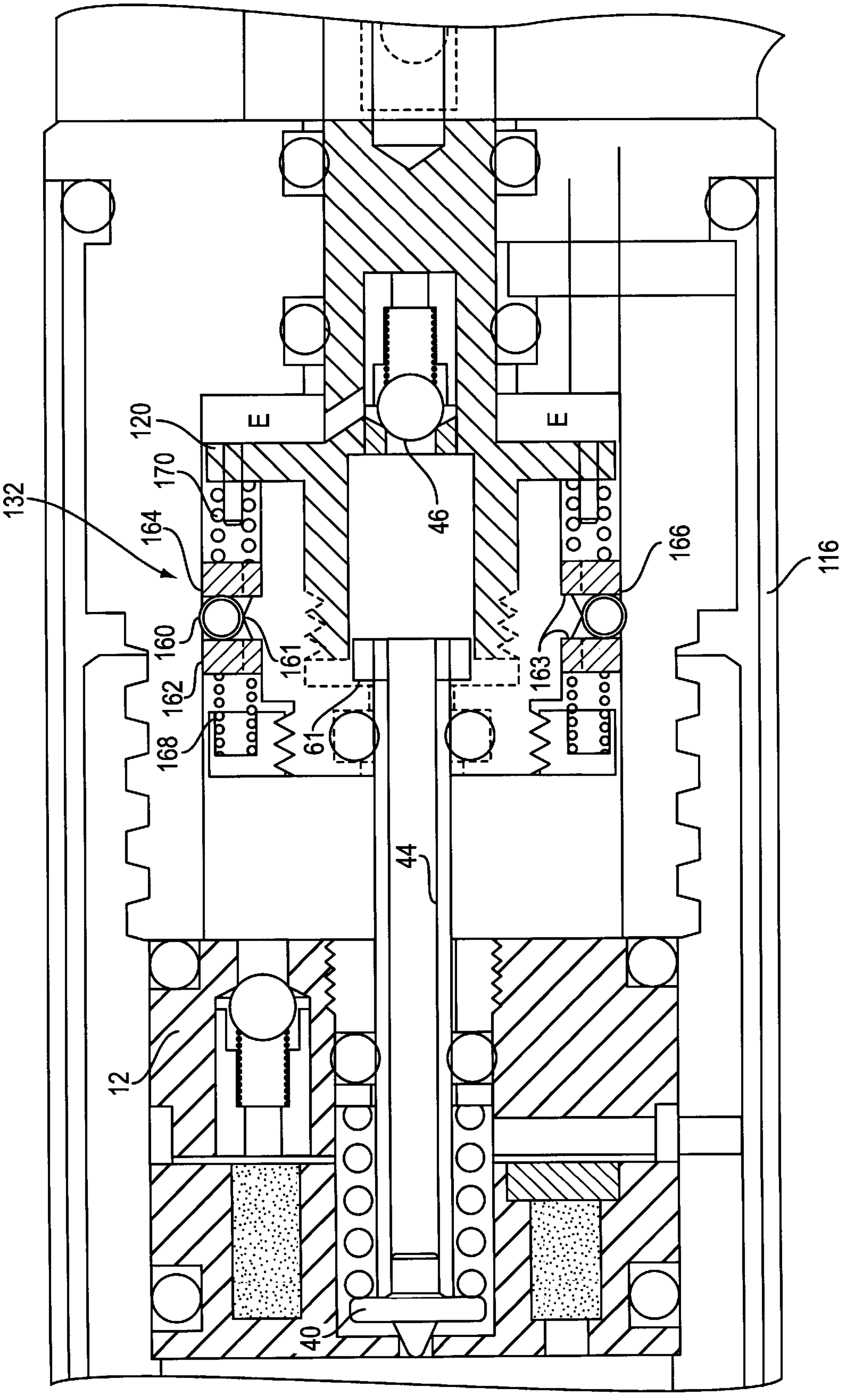
FIG. 5 is an enlarged view of the pump piston and bulkhead of the hydraulic tool of FIG. 2.

The pump piston 120 of the second embodiment has a different valve structure associated therewith than in the first embodiment of the invention. With reference to FIG. 5, an enlarged view of the generally cylindrical pump piston 120 of FIG. 2 is shown. Instead of providing conduits and check valves 80 and 86 in the pump piston as in the first embodiment of the invention, valve structure in form of a bi-stable floating seal valve arrangement, generally indicated at 132, is provided. The floating seal valve arrangement 132 comprises an O-ring 160 positioned to seat on a raised ridge 161 of the pump piston 120. Two opposing spring loaded guide rings, 162 and 164, keep the O-ring 160 on the ridge 161 and in a sealed position. Stop surfaces 163 limit the movement of the guide rings toward the O-ring 160. During operation, when the pressure in pumping chamber D reaches that planned for the transition to the high force/low speed mode, loaded spring 170 is overcome by the force of the fluid on the O-ring 160, thus moving the O-ring 160 off its seat and permitting the fluid to flow through passage 166 from the pumping chamber D to the pump reservoir chamber E. Spring 168 is normally loaded, and accommodates the passage of fluid from chamber E to chamber D during the pump refilling operation pursuant to another stroke.

The embodiment of FIG. 2 includes a handle structure, generally indicated at 150, which is operatively associated with pump rod 26 of the pump piston to actuate the same. The handle structure 150 includes a hand-operated trigger member 152 which, when actuated or squeezed, causes actuation of the tool 100 and which, when released, causes the return stroke of the ram piston 112, thus resetting the tool 100. It can be appreciated that the handle structure 150 can be provided on the tool 10 of the embodiment of FIG. 1 as well.

A mechanical linkage, generally indicated at 154, is coupled with the over-pressure release valve structure 36 and is used to move the valve member 40 of the valve structure 36 to an open position so that fluid may flow from the drive chamber C to the accumulator chamber A and to the pump reservoir chamber E, as noted above. The mechanical linkage is connected to the pump piston 120 with a limited slip connection so that over travel of the pump piston 120 beyond a the normal stoke moves the valve member 40 to the opened position.

Figure 6:
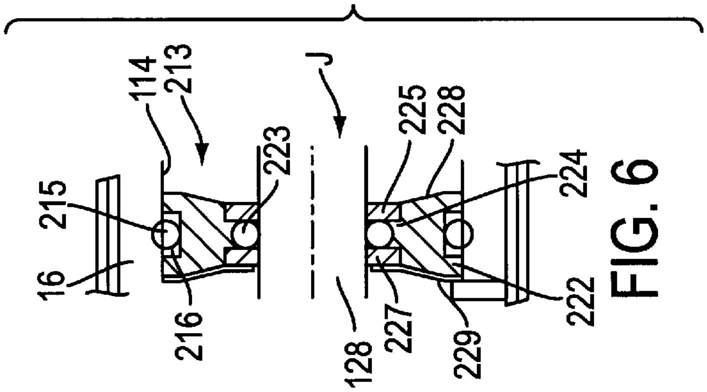
FIG. 6 is a floating seal valve provided in accordance with another embodiment of the invention.

FIG. 6 shows yet another embodiment of a bi-stable floating seal valve associated with the barrier 222. A first O-ring 215 disposed in groove 216 between bore 114 of the housing 16 and the periphery of the barrier 222 so seal a flow path between chamber A and B. The seal valve includes a second O-ring 223 positioned to seat on a raised ridge 224 of the barrier 222. Two opposing spring loaded guide rings, 225 and 227, keep the O-ring 223 on the ridge 224 and in a sealed position. The guide rings 225 have fluid flow passages therein to permit fluid flow between chambers A and B when desired. Finger springs 228 and 229 load the guide rings 225 and 227. The spring load of spring 229 is greater than that of spring 228. The spring load of spring 229 is selected such that when conditions are such that fluid may flow from ram reservoir chamber B to accumulator chamber A, the spring 229 will flex to permit fluid to flow past the O-ring 223 in the direction of arrow J and through passages in the guide rings. Similarly, the spring load of the spring 228 is such that in a ram piston retracting mode, fluid may flow past O-ring 223 through passages in the guide rings in the direction opposite to arrow J such that fluid in the accumulator chamber A may move into ram reservoir chamber B to effect the shift between the high-speed/low force and the mid-speed/mid force modes of operation.

Thus, the present invention provides a hydraulic tool which moves a ram piston at three different speeds and hence at three different magnitudes of force, as a result of a constant input force and input speed of a pump piston. Speed changes are accomplished automatically, responsive to resistance encountered by the ram piston.

The foregoing preferred embodiment has been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A hydraulic device comprising:

a housing having first and second ends, a bulkhead disposed in said housing between said ends, a pump piston in said housing generally at said first end thereof, said pump piston having first and second end surfaces, said second end surface of said pump piston and surfaces of said housing and of said bulkhead defining a pumping chamber, said pump piston being constructed and arranged to move within said housing to develop pressure on fluid in said pumping chamber, said first end surface of said pump piston and surfaces of said first end of said housing defining a pump reservoir chamber, a ram piston in said housing generally at said second end thereof, said ram piston having first and second end surfaces, said first end surface of said ram piston and surfaces of said housing and of said bulkhead defining a drive chamber, connecting structure associated with said bulkhead and constructed and arranged to communicate said pumping chamber with said drive chamber so that fluid pressure developed in said pumping chamber may be exerted on said first end surface of said ram piston, a barrier in said housing between said second end of said housing and said ram piston, surfaces of said housing, said barrier and said second end surface of said ram piston defining a ram reservoir chamber, and surfaces of said second end of said housing and of said barrier defining an accumulator chamber, passage and valve structure associated with said barrier constructed and arranged to selectively permit fluid to flow from said ram reservoir chamber to said accumulator chamber and from said accumulator chamber to said ram reservoir chamber, passage and valve structure associated with said ram piston constructed and arranged to permit fluid flow from said ram reservoir chamber to said drive chamber, passage and valve structure associated with said pump piston constructed and arranged to selectively permit fluid flow from said pump reservoir chamber to said pumping chamber and from said pumping chamber to said pump reservoir chamber, and communication structure fluidly communicating said accumulator chamber with said pump reservoir chamber, wherein said communication structure, said connecting structure and said passage and valve structures are constructed and arranged to permit movement of said ram piston selectively at three speeds with corresponding magnitudes of force relative to a single speed of said pump piston.

2. The hydraulic device according to claim 1, wherein said passage valve structures are constructed and arranged such that:

(1) a high speed mode of operation of the ram piston occurs when (a) said pumping chamber communicates with said drive chamber via said connecting structure associated with said bulkhead, (b) said ram reservoir chamber communicates with said drive chamber via said passage and valve structure associated with said ram piston, and (c) said accumulator chamber communicates with said pump reservoir chamber via said communication structure, (2) an intermediate speed mode of operation of the ram piston occurs when (a) said pumping chamber communicates with said drive chamber via said connecting structure associated with said bulkhead, (b) said ram reservoir chamber communicates with said accumulator chamber via said passage and valve structure associated with said barrier, and (c) said accumulator chamber communicates with said pump reservoir chamber via said communication structure, and (3) a low speed mode of operation of the ram piston occurs when (a) said pumping chamber communicates with said piston reservoir chamber via said passage and valve structure associated with said pump piston, (b) said pumping chamber communicates with said drive chamber via said connecting structure associated with said bulkhead, and (c) said ram reservoir chamber communicates with said accumulator chamber via the passage and valve structure associated with said barrier.

3. The hydraulic device according to claim 2, wherein said passage and valve structure associated with said barrier includes a pair of check valves with each check valve being disposed in a separate conduit communicating the ram reservoir chamber with said accumulator chamber, one of said check valves permits fluid to flow only from said ram reservoir chamber to said accumulator chamber while the other of said check valves permits fluid to flow only from said accumulator chamber to said ram reservoir chamber.

4. The hydraulic device according to claim 2, wherein said passage and valve structure associated with said pump piston includes a pair of check valves with each check valve being disposed in a separate conduit communicating the pump reservoir chamber with said pumping chamber, one of said check valves permits fluid to flow only from said pump reservoir chamber to said pumping chamber while the other of said check valves permits fluid to flow only from said pumping chamber to said pump reservoir chamber.

5. The hydraulic device according to claim 1, wherein said communication structure comprises a plurality of interconnected conduits and a valve.

6. The hydraulic device according to claim 5, wherein said valve is a check valve.

7. The hydraulic device according to claim 2, wherein said passage and valve structure associated with said ram piston includes a check valve disposed in a conduit communicating said ram reservoir chamber with said drive chamber.

8. The hydraulic device according to claim 1, further comprising handle structure including a trigger member coupled with said pump piston such that movement of said trigger member moves said pump piston.

9. The hydraulic device according to claim 2, wherein said passage and valve structure associated with said barrier includes a floating seal valve assembly including a first floating seal valve and a second floating seal valve, said first floating seal valve comprising an O-ring disposed to selectively seal a first passage between a periphery of said barrier and an inner bore of said housing, and a flexible first retainer member coupled to face of said barrier and operatively associated with the O-ring, said retainer member biasing the O-ring to seal said first passage, said second floating seal valve comprising a second O-ring, and a flexible second retainer constructed and arranged to selectively seal a second passage defined between said accumulator chamber and said ram reservoir chamber, said first retainer being constructed and arranged such that when conditions are such that fluid may flow from said ram reservoir chamber to said accumulator chamber, the first retainer will flex to permit said first O-ring to open said first passage and permit fluid to flow past the first O-ring, and said second retainer being constructed and arranged such that fluid may flow past said second O-ring permitting fluid in the accumulator chamber to flow through the second passage and into said ram reservoir chamber.

10. The hydraulic device according to claim 2, wherein said valve structure associated with said ram piston includes a floating seal valve arrangement comprising an O-ring arranged to seal a passage between a periphery of the ram piston and an inner bore of said housing, and retainer member coupled to the ram piston and operatively associated with the O-ring, said retainer member being constructed and arranged to bias the O-ring to seal said passage under certain conditions, and to permit the O-ring to open the passage and permit fluid to flow through the passage connecting the ram reservoir chamber with the drive chamber.

11. The hydraulic tool according to claim 2, wherein said passage and valve structure associated with said pump piston includes a bi-stable floating seal valve arrangement comprising:

an O-ring disposed about a ridge defined on said pump piston and disposed between first and second retainer members so as to selectively seal a passage between said pumping chamber and said pump reservoir chamber, a first spring structure biasing the first retainer towards said O-ring, and a second spring structure biasing the second retainer towards said O-ring, said spring structures being constructed and arranged such that when fluid pressure conditions are such to permit fluid flow from said pumping chamber to said pump reservoir chamber, fluid may flow in one direction past the O-ring through said passage and into the pump reservoir chamber, and when fluid pressure conditions are such that fluid may flow from said pump reservoir chamber to said pumping chamber, fluid may flow in a direction opposite the one direction past the O-ring and through said passage and into said pumping chamber.

12. The hydraulic device according to claim 9, wherein a ram rod is coupled to said ram piston and extends through a bore in said barrier, said second passage being defined between an outer periphery of ram rod and an annular wall defining said bore in said barrier.

13. The hydraulic device according to claim 1, wherein a check valve is provided in said connecting structure preventing fluid flow from said drive chamber to said pumping chamber.

14. The hydraulic device according to claim 1, wherein a filter is provided in said connecting structure to filter fluid passing therethrough.

15. A hydraulic device comprising:

a housing having first and second ends, a bulkhead disposed in said housing between said ends, a pump piston in said housing generally at said first end thereof, said pump piston having first and second end surfaces, said second end surface of said pump piston and surfaces of said housing and of said bulkhead defining a pumping chamber, said pump piston being constructed and arranged to move within said housing to develop pressure on fluid in said pumping chamber, said first end surface of said pump piston and surfaces of said first end of said housing defining a pump reservoir chamber, a ram piston in said housing generally at said second end thereof, said ram piston having first and second end surfaces, said first end surface of said ram piston and surfaces of said housing and of said bulkhead defining a drive chamber, a barrier in said housing between said second end of said housing and said ram piston, surfaces of said housing, said barrier and said second end surface of said ram piston defining a ram reservoir chamber, and surfaces of said second end of said housing and of said barrier defining an accumulator chamber, passage and valve structure associated with said barrier constructed and arranged to selectively permit fluid to flow from said ram reservoir chamber to said accumulator chamber and from said accumulator chamber to said ram reservoir chamber, passage and valve structure associated with said pump piston constructed and arranged to selectively permit fluid flow from said pump reservoir chamber to said pumping chamber and from said pumping chamber to said pump reservoir chamber, connecting structure in said bulkhead and constructed and arranged to communicate said pumping chamber with said drive chamber so that fluid pressure developed in said pumping chamber may be exerted on said first end surface of said ram piston, communication structure fluidly communicating said accumulator chamber with a bulkhead chamber, and a pressure releasing valve structure disposed in said bulkhead and operatively associated with said pump piston, said pressure releasing valve structure including a conduit communicating said bulkhead chamber with said pump reservoir chamber such that when the pump piston moves to an over-traveled position, said pressure releasing valve structure opens a passage between said drive chamber and said bulkhead chamber (1) to permit fluid in the drive chamber to communicate with the accumulator chamber via said communication structure, with fluid back filling the ram reservoir chamber via said passage and valve structure associated with said barrier, and (2) to permit fluid in said drive chamber to communicate with the piston reservoir chamber via said conduit, with fluid in said pump reservoir chamber communicating with said pumping chamber via said passage and valve structure associated with said pump piston.

16. The hydraulic device according to claim 15, wherein a check valve is provided in said connecting structure preventing fluid flow from said drive chamber to said pumping chamber.

17. The hydraulic device according to claim 15, wherein a filter is provided in said connecting structure to filter fluid passing therethrough.

18. The hydraulic device according to claim 15, wherein said pressure releasing valve structure comprises a valve member biased by a spring, said valve member selectively sealing said passage.

19. The hydraulic device according to claim 18, wherein said pressure releasing valve structure is constructed and arranged to function as an over-pressure relief mechanism such that when pressure in said drive chamber reaches a pre-determined pressure, said valve member opens said passage permitting pressure in said drive chamber to be reduced below said pre-determined pressure.

20. The hydraulic device according to claim 15, further including a check valve disposed in said pump piston preventing back flow from said pump reservoir chamber to said bulkhead chamber.

21. The hydraulic device according to claim 15, further comprising a mechanical linkage operatively associated with said pump piston and being constructed and arranged such that upon over travel of said pump piston, said over-pressure valve structure opens said passage.

22. A hydraulic tool comprising:

housing structure, a pump piston disposed in said housing structure to define a pumping chamber at one end thereof and a pump reservoir chamber at another end of said pump piston, said pump piston being constructed and arranged to move within said housing structure to develop pressure on fluid in said pumping chamber, a ram piston disposed in said housing structure to define a drive chamber, said ram piston having a front surface and an opposing rear surface, an accumulator in selective communication with said rear surface of said ram piston, fluid circuitry permitting fluid communication between said pumping chamber and said drive chamber such that fluid pressure developed in said pumping chamber is imposed on said front surface of said ram piston to move said ram piston in a certain direction, said fluid circuitry being constructed and arranged to move said ram piston in said certain direction at three different speeds with corresponding magnitudes of force relative to a single speed of said pump piston, and valve structure constructed and arranged to selectively communicate said drive chamber with said pump reservoir chamber and with said accumulator thereby initiating movement of said ram piston in a direction opposite said certain direction.

23. The hydraulic tool according to claim 22, wherein said pump piston has an input shaft, and a trigger member is coupled to said input shaft, said trigger member being constructed and arranged to be actuated so as to move said pump piston.

24. The hydraulic tool according to claim 22, wherein a barrier is provided in said housing between an end thereof and said ram piston, an accumulator chamber being defined by said barrier and said end of said housing, said ram piston reservoir chamber being defined by said ram piston and said barrier, said fluid circuitry including passage and valve structure associated with said barrier to selectively permit fluid to communicate between said ram reservoir chamber and said accumulator chamber, said fluid circuitry including communication structure communicating said accumulator chamber with said pump reservoir chamber.

25. The hydraulic tool according to claim 22, wherein a bulkhead is provided in said housing and separates said pumping chamber from said drive chamber, said fluid circuitry including passage and valve structure associated with said bulkhead to permit fluid to flow from said pumping chamber to said drive chamber, said ram return valve structure being disposed in said bulkhead so as to selectively seal a passage connecting said pump reservoir chamber with said drive chamber.

26. A seal valve arrangement for a hydraulic device, the hydraulic device having an inner bore, a piston movable within the bore, and fluid pressure chambers on opposing sides of said piston, said seal valve arrangement comprising:

an O-ring disposed on a periphery of the piston, the O-ring being disposed between first and second retainers so as to selectively seal a passage defined between the bore and the periphery of the piston, a first spring structure biasing the first retainer towards said O-ring, and a second spring structure biasing the second retainer towards said O-ring, said first and second spring structures having springs loads such that under certain fluid pressure conditions in said chambers, said O-ring seals said passage to prevent fluid flow through said passage in one direction while permitting fluid flow in a direction opposite said one direction, and under different pressure conditions in said chambers, said O-ring seals said passage to prevent fluid from flowing through said passage in said opposite direction while permitting fluid to flow through said passage in said one direction.

27. The seal valve arrangement according to claim 26, wherein said piston includes a stop surface to limit movement of each of said spring-biased retainers toward said O-ring, and said periphery of sad piston includes a ridge, said O-ring being disposed on said ridge.

28. A seal valve arrangement for a hydraulic device, the hydraulic device having an inner bore and an element disposed in the bore, the element being constructed and arranged to define a fluid passage between the bore and a periphery of the element, said seal arrangement comprising:

a seal member disposed generally adjacent to the fluid passage, and a spring retainer member coupled to said element and operatively associated with the seal member to bias the seal member to seal said fluid passage under certain fluid pressure conditions, and under different fluid pressure conditions, to permit the seal member to open the fluid passage to permit fluid to flow therethrough.

29. The seal valve arrangement according to claim 28, wherein the element includes a shaft extending therethrough with a second fluid passage defined between the shaft and the element, and further including a second valve arrangement comprising:

a second seal member disposed generally adjacent said second fluid passage, a retainer member coupled to said element and operatively associated with the second seal member to bias the second seal member to seal said second fluid passage under certain fluid pressure conditions, and under different fluid pressure conditions, to permit the second seal member to open the second fluid passage to permit fluid to flow therethrough.

30. A seal valve arrangement for a hydraulic device having an element mounted within an inner bore, a shaft extending through said element, and fluid pressure chambers on opposing sides of said element, said seal valve arrangement comprising:

an O-ring mounted with respect to said element and being disposed about said shaft so as to selectively seal a passage defined between the element and the shaft, a first spring structure biasing the O-ring in a first direction, and a second spring structure biasing the O-ring in a direction opposite the first direction, said first and second spring structures having springs loads such that under certain fluid pressure conditions in said chambers, said O-ring seals said passage to prevent fluid flow through said passage in one direction while permitting fluid flow through said passage in a direction opposite said one direction, and under different pressure conditions in said chambers, said O-ring seals said passage to prevent fluid flow through said passage in said opposite direction while permitting fluid flow through said passage in said one direction.

31. The seal valve arrangement according to claim 28, wherein said first seal member is an O-ring.

32. The seal valve arrangement according to claim 29, wherein said second seal member is an O-ring.

33. The seal valve arrangement according to claim 29, wherein said retainer member and said seal member are constructed and arranged to repeatably seal and repeatably open said fluid passage.

34. The seal valve arrangement according to claim 28, wherein said retainer member and associated second seal member are constructed and arranged to repeatably seal and repeatably open said second fluid passage.

35. The seal valve arrangement according to claim 8, wherein said element is a piston movable in the bore.

* * * * *